United States Patent [19]
Tsygankov et al.

[11] 3,956,021
[45] May 11, 1976

[54] STORAGE BATTERY

[76] Inventors: Mikhail Stepanovich Tsygankov, ulitsa Ordzhonikidze, 14, kv. 24; Nina Alexandrovna Bitjutskaya, ulitsa Stepana Razina, 36, kv. 18; Vera Nikonorovna Fateeva, ulitsa Ordzhonikidze, 14, kv. 28; Valery Nikolaevich Kosholkin, Novo-Astrakhanskoe shosse, 43, kv. 47; Boris Dmitrievich Karev, ulitsa Millerovskaya, 73a, kv. 4; Nikolai Alexeevich Kudinov, ulitsa Chapaeva, 128; Mars Mikhailovich Kholkin, ulitsa Chapaeva, 29, kv. 28; Nikolai Nikiforovich Moiseev, prospekt Kirova, 15, kv. 4; Oleg Georgievich Malandin, ulitsa Sovetskaya, 23, kv. 23, all of Saratov, U.S.S.R.

[22] Filed: May 9, 1974

[21] Appl. No.: 468,549

[52] U.S. Cl. .................... 136/166; 136/171
[51] Int. Cl.² .............................. H01M 2/04
[58] Field of Search ........... 136/171, 181, 173, 166

[56] References Cited
UNITED STATES PATENTS

| | | | |
|---|---|---|---|
| 2,206,306 | 7/1940 | Sager | 136/171 |
| 2,505,207 | 4/1950 | Riggs | 136/171 |

FOREIGN PATENTS OR APPLICATIONS

| | | | |
|---|---|---|---|
| 670,377 | 9/1963 | Canada | 136/181 |

*Primary Examiner*—Donald L. Walton
*Attorney, Agent, or Firm*—Haseltine, Lake & Waters

[57] ABSTRACT

A storage battery adapted to be mounted in a compartment, preferably of an aircraft, wherein on one of the walls of a metal container with a plastic lid having a projection there is provided a plug member connectable to a mating plug means. The contact sockets of this plug member are hollow cylinders divided by longitudinal slots into sectors on the side of insertion of the mating plug member. The contact sockets are of a "floating" structure displaceable in any direction relative to the central axis thereof. The metal container has insulating strips secured to its bottom and to the lower portions of the longitudinal side walls and serving, together with the plastic lid, as electric insulation of the container from the compartment and as guides when this storage battery is being mounted in the compartment and automatically coupled to the electrical wiring system of the aircraft by engagement of the plug member with the mating plug member. In order to retain the storage battery in the compartment as the automatic coupling thereof to the electrical wiring system of the aircraft takes place, the metal container is provided with a projection in the lower portion of the lateral side wall carrying said plug member and with a pair of studs arranged on the longitudinal side walls.

3 Claims, 4 Drawing Figures

STORAGE BATTERY

FIELD OF THE INVENTION

The present invention relates to electric storage batteries and is intended for use in vehicles as a stand-by power source and as a means for the self-contained starting of engines.

The storage battery disclosed herein may be used, for example, in aircraft, such as airplanes and helicopters.

BACKGROUND

When creating a stand-by power source for an aircraft, one has to solve problems involving electric insulation of the metal container of the storage battery from the fuselage compartment wherein it is mounted. In addition, provision must be made for reliable automatic coupling of the electrical wiring system.

There are known storage batteries for aircraft applications, manufactured by SAFT company, having metal containers with metal lids and having plug members the contact sockets whereof are divided each into four segments.

Disadvantages inherent in these known storage batteries lie in the absence of electric insulation of the metal container from the fuselage compartment, as well as the impossibility to effect dependable automatic connection of the battery to the electrical wiring system of the aircraft, insuring reliable collection of current.

It is common knowledge that, in an aircraft, a storage battery is operated as a buffer battery in parallel either with d-c generators or with transformer-rectifier units which are the main sources of electric power.

The metal fuselage is used as a power conductor in the aircraft electrical wiring system. Therefore, the absence of electric insulation of the metal container from the fuselage may lead to short-circuiting, e.g. of the generator, through the metal fuselage, metal container of the storage battery and its circuit elements. The probability of such short-circuiting is enhanced by improper maintenance of the storage battery, resulting in the penetration thereinto of foregin objects, carbonates or electrolytes forming shunting bridges between the electric circuitry of the storage battery and its metal container. Since the main power sources of an aircraft more often than not feature relatively great power output, as great as several to tens of kilowatts, the formation of such a shunting bridge may cause complete failure of the storage battery and even set the aircraft afire.

Normally, after mounting a storage battery in an aircraft, it is manually connected to the electrical wiring system of the aircraft by means of a plug member on the container of the storage battery and a mating plug member on a flexible cable which is part of the airborne equipment. When a storage battery has high starting characteristics and should be automatically coupled to aircraft electrical wiring system, as it is mounted in the aircraft, the known plug-and-socket connectors fail to ensure reliable collection of current from the battery.

SUMMARY OF INVENTION

It is an object of the present invention to eliminate the above disadvantages.

Another object of the invention is to provide a storage battery for automatic coupling thereof to the electrical wiring system of an aircraft with reliable electric insulation of the metal container of the battery from the fuselage and insuring dependable electric connection thereof to the aircraft electrical wiring system by means of a plug member on the container and a mating plug member rigidly attached to the wall of the fuselage compartment.

These and other objects are attained in accordance with the invention by the provision of a storage battery adapted to be mounted within a compartment, e.g. of an aircraft, comprising a metal container with a lid, there being provided on one of the lateral side walls of this container a plug member adapted for electric connection to a mating plug member, in which battery, in accordance with the present invention, the metal container has a projection on the lower portion of the lateral side wall carrying the plug member, the container further having two studs arranged on the longitudinal walls thereof and intended for securing the battery in the compartment when the storage battery is automatically coupled to the electrical wiring system of the aircraft, the container being provided with insulating strips on the bottom and in the lower portions of the longitudinal walls thereof, the lid of the metal container being made of plastic and having projections which, together with the insulating strips of the container, provide for electric insulation of the container from the compartment and serve as guides when the storage battery is mounted in the compartment and automatically coupled to the aircraft electrical wiring system by means of the plug member and the mating plug member rigidly secured in the compartment, the contact sockets of the plug member being hollow cylinders divided along the generatrices thereof into sectors by slots on the side of insertion of said mating plug member.

It is preferred, in order to insure reliability of the coupling operation, that each said socket of the plug member be of a "floating" structure, displaceable in any direction from the central axis thereof, the ratio of the width of said sector to the internal diameter of the contact socket of the plug member ranging from 0.075 : 1 to 0.150 : 1.

The herein disclosed storage battery, of which the metal container is provided with a projection on the lower portion of the lateral side wall, carrying the plug member, as well as with studs on the longitudinal walls, with insulating strips on the bottom and on the lower portions of the longitudinal side walls thereof and with a plastic lid with projections, insures automatic coupling thereof to the electrical wiring system of the aircraft and dependable insulation of the metal container of the storage battery from the fuselage compartment which forms a part of one of the power conductors of the aircraft electrical wiring system.

Furthermore, the projections of the plastic lid and the insulating strips of the metal container of the storage battery serve as guides when the battery is mounted in the aircraft, whereas the "floating" sockets of the plug member, divided into sectors by said slots, insure dependable electric contact between the battery and the mating plug member rigidly attached to the wall of the fuselage compartment, as the storage battery is automatically coupled to the electrical wiring system of the aircraft. An adequately dependable electric contact between the socket of the plug member and the mating plug member is attained when the ratio of the width of a sector to the internal diameter of the contact socket ranges from 0.075 : 1 to 0.150:1.

The herein disclosed embodiment of the container and lid of the storage battery substantially simplifies and facilitates mounting of the battery in an aircraft and removing same therefrom; it further enables minimizing the dimensions of the battery-housing compartment, making them but negligibly greater than the dimensions of the battery itself, which is quite essential in the case of an aircraft where any reduction in space and weight is of paramount importance.

BRIEF DESCRIPTION OF DRAWING

The invention will be further described in greater detail with reference to a preferred embodiment thereof taken in conjunction with the accompanying drawings, wherein.

DETAILED DESCRIPTION

Figure 1:
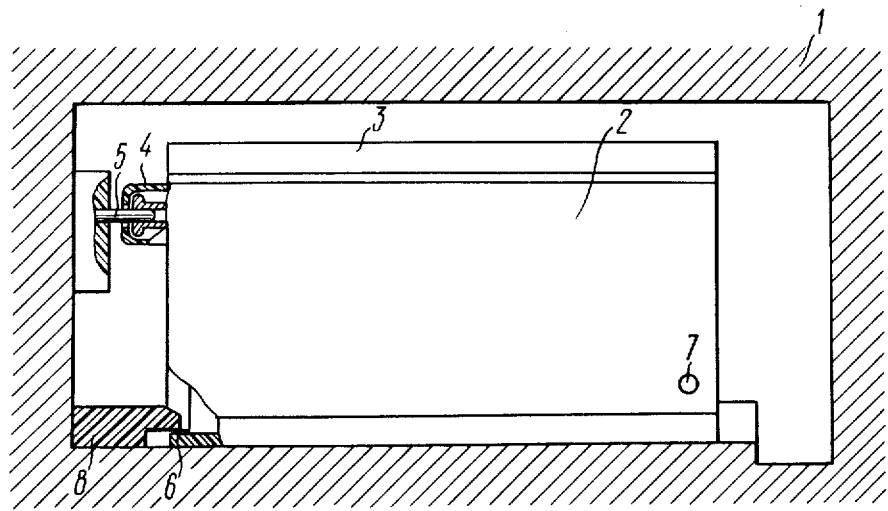
FIG. 1 is a side view of a storage battery mounted in a fuselage compartment of an aircraft.

Referring now in particular to the appended drawings, the storage battery (FIGS. 1 and 2) is mounted in a compartment 1 of an aircraft and includes a metal container 2 with a plastic lid 3, one of the lateral side walls of the container being provided with a plug member 4 adapted to be electrically connected to a mating plug member 5 rigidly secured in the compartment 1.

Figure 3:
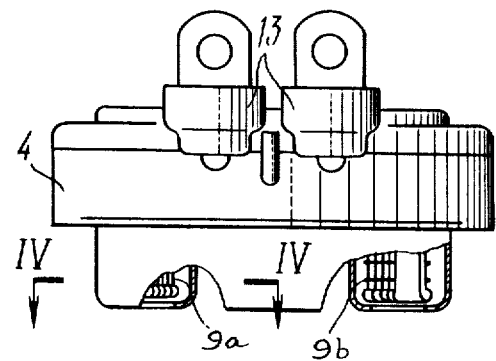
FIG. 3 is a general view of the plug member.

The metal container 2 is provided with a projection 6 on the lateral side wall thereof, supporting the plug member 4, as well as with a pair of studs 7 on the longitudinal side walls of the container, intended for retaining the storage battery in the compartment 1, as it is automatically coupled to the electrical wiring system of the aircraft. As the battery is being mounted in the compartment 1 of the aircraft, the projection 6 of the container 2 is received under a specially provided lug 8 rigidly secured in the compartment 1. At the same time contact sockets 9a and 9b (FIG. 3) of the plug member 4 automatically engage the mating plug member 5 (FIG. 1) likewise rigidly secured in the compartment 1. The studs 7 retain the storage battery in this coupled position, insuring that the storage battery is held fast within the compartment 1.

The metal container 2 is provided with insulating strips 10, while the plastic lid 3 is provided with projections 11.

Figure 2:
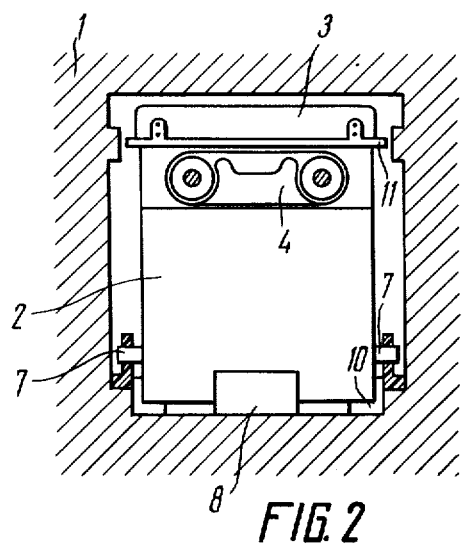
FIG. 2 illustrates the battery mounted in the fuselage compartment of the aircraft, as viewed from the wall carrying the plug member.

The insulating strips 10 of the metal container 2 and the projections 11 on the lid 3 thereof insure electric insulation of the container from the compartment 1 and also serve as guides when the storage battery is mounted in the aircraft and automatically coupled to the aircraft electrical wiring system by engagement of the plug member 4 with the mating plug member 5 (FIG. 1).

Should the electric circuit of the storage battery shortcircuit with the metal container 2 through foreign objects, carbonates or electrolyte which may appear on the top surface of the battery as a result of improper maintenance of the storage battery, the metal container 2 of the battery nevertheless remains electrically disconnected from the compartment 1 which is one of the power conductors of the electrical wiring system of the aircraft. This feature prevents short-circuiting of the main power sources, e.g. of the generators, through the series circuit including the compartment 1, metal container 2 and the electric circuit of the storage battery, which steps up the reliability of the performance of the battery and enhances the safety factor.

The plug member 4 (FIG. 3) has a pair of contact sockets 9a and 9b, each of a "floating" structure, i.e. capable of a limited displacement in any direction relative to the central axis of the contact socket 9 to facilitate and insure automatic engagement and coupling thereof with the mating plug member 5 (FIG. 1). This possibility of displacement of each contact socket 9 relative to the central axis thereof is provided for by an annulus 12 (FIG. 4) between each contact socket 9 and the plug member 4 (FIG. 3) and by the contact sockets 9a and 9b of the plug member 4 being connected to the electric circuit of the storage battery through flexible leads 13.

Figure 4:
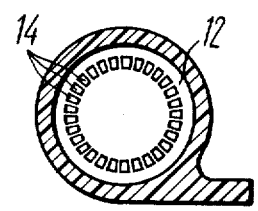
FIG. 4 is a cross-sectional view of a contact socket of the plug member.

Each contact socket 9 of the plug member 4 (FIG. 3) is divided into sectors 14 (FIG. 4). It is preferred that the ratio of the width of each sector 14 to the internal diameter of the contact socket 9 should range from 0.075: 1 to 0.150 : 1, which insures reliable electric contact between the socket 9 of the plug member 4 and the mating plug member 5 (FIG. 1), as the storage battery is automatically coupled to the electrical wiring system of the aircraft.

What is claimed is:

1. A storage battery adapted to be mounted in a compartment and adapted for being connected to a plug member attached to a wall of said compartment, said battery comprising: a metal container including a plastic lid including projections and further including lateral and longitudinal walls; a plug socket means on said metal container and connectible to the plug member attached to the wall of said compartment; said metal container including a projection on a lateral wall thereof, carrying said plug socket means, and at least two studs arranged on the said longitudinal walls and adapted to retain said storage battery in said compartment; insulating strips on the said longitudinal walls of said metal container and serving, together with said plastic lid, as electric insulation between said metal container and said compartment and as guides when said storage battery is mounted in said compartment and said plug member is engaged with said plug socket means; said plug socket means including contact sockets in the form of hollow cylinders divided along the generatrices thereof into a plurality of sectors by slots provided in said plug socket means.

2. A storage battery as claimed in claim 1, wherein each said contact socket is of a "floating" structure enabling displacement of said contact socket in any direction relative to the central axis thereof, to insure said automatic coupling.

3. A storage battery as claimed in claim 1, wherein the ratio of the width of said sector to the internal diameter of said contact socket of said plug member ranges from 0.075 : 1 to 0.150 : 1, insuring dependable electric connection of said plug member to said plug socket means as automatic coupling takes place.

* * * * *